United States Patent Office 2,865,910
Patented Dec. 23, 1958

2,865,910
WATER-INSOLUBLE DYESTUFFS

Christian Zickendraht, Binningen, Switzerland, assignor to Ciba Limited, Basel, Switzerland, a Swiss firm No Drawing. Application December 6, 1955
Serial No. 551,211

Claims priority, application Switzerland
December 16, 1954

7 Claims. (Cl. 260—147)

This invention provides valuable new water-insoluble dyestuffs which are isothiuronium salts of which the anion is that of a chromiferous monoazo-dyestuff.

The invention also provides a process for the manufacture of the aforesaid water-insoluble dyestuffs, wherein an acid chromiferous monoazo-dyestuff is reacted with a derivative of isothiourea.

As acid chromiferous monoazo-dyestuffs there may be mentioned, more especially, those which contain a sulfone group, a sulfonic acid amide group, a carboxylic acid group or preferably a sulfonic acid group.

Among these dyestuffs there may be mentioned, for example, the so-called 1:2-monoazo-dyestuff--chromium complexes which contain one atom of chromium bound in complex union to two molecules of monoazo-dyestuff, and above all the so-called 1:1-chromium complexes of monoazo-dyestuffs containing sulfonic acid groups, which complexes contain one atom of chromium in complex union per molecule of monoazo-dyestuff, such as the dyestuffs known in commerce under the name "Neolan dyestuffs."

A large number of chromiferous dyestuffs suitable for the present process are known, but those which are not known can be made by methods in themselves known.

As derivatives of isothiourea to be used as starting materials in the present invention there are to be understood those water-soluble S-isothiourea derivatives which contain an isothiuronium cation, such as isothiuronium bases (provided they are stable) and above all isothiuronium salts of organic or preferably inorganic acid, for example, isothiuronium halides and if desired mixtures thereof. There come into consideration, for example, S-acyl-isothiuronium halides, but more especially isothiuronium salts which contain bound to the sulfur atom of the isothiuronium ion an aliphatic, alicyclic or heterocyclic radical, such as S-cycloalkyl-isothiuronium chlorides and S-alkyl-isothiuronium chlorides, or a radical, advantageously an aromatic radical, bound through an alkylene or alkylidene group. The substituent bound to the sulfur atom is advantageously one that is free from groups imparting solubility in water. It may, however, contain other substituents, such as acyl groups (for example, acetyl or benzoyl groups), carbalkoxy groups (for example, carbomethoxy or carbethoxy groups), ether groups (for example, alkoxy groups), and also keto, hydroxyl or amino groups.

Especially valuable results are obtained with S-alkyl- and S-aralkyl-isothiuronium salts which contain at least four carbon atoms in the isothiuronium cation.

Suitable S-isothiuronium derivatives are, for example, as follows: S-methyl-, S-ethyl-, S-isopropyl-, S-tertiary-butyl-, S-tertiary-amyl-, S-cyclohexyl- or S-lauryl-isothiuronium chloride or bromide, S-carbomethoxymethyl-isothiuronium chloride, S-carbethoxymethyl-isothiuronium chloride, S-acetonyl-isothiuronium chloride and above all S-benzyl-isothiuronium chloride.

These isothiurea derivatives to be used in the present process can be made by methods in themselves known, for example, by reacting thiourea in aqueous or alcoholic solution or suspension with an organic compound containing mobile halogen atoms, especially an organic compound containing a single mobile chlorine atom. There are advantageously used organic compounds which are free from substituents imparting solubility in water. Thus, thiourea may be reacted, for example, with methyl, ethyl, isopropyl, tertiary amyl, cyclohexyl or lauryl chloride or with chloracetone, bromacetone, chloracetic acid methyl or ethyl ester or above all with benzyl chloride in water, in acetone or in alcohol at the boiling temperature of the reaction mixture. The isothiuronium halides so obtained may, for example, be separated by filtration or the reaction mixture may be used as such in the process of the invention. Instead of the aforesaid isothiuronium halides there may be used other isothiuronium salts, for example, isothiuronium acetate or isothiuronium sulfonate such as are obtainable, for example, from para-toluene sulfonic acid alkyl esters by reaction with thiourea.

The reaction of the aforesaid thiourea derivatives with the aforesaid dyestuffs is advantageously carried out in an aqueous medium at a raised temperature or at ordinary temperature, if desired, in the presence of a suitable addition.

It is desirable to use a reaction medium which is neither too strongly alkaline nor too strongly acid, as under such conditions the isothiuronium salts may decompose at least partially. Accordingly, it is of advantage to use a practically neutral or weakly acid medium. The dyestuffs are advantageously used in the form of their soluble salts, preferably their alkali metal salts. Thus, for example, an aqueous solution or partial suspension of one or more dyestuff alkali metal salts may be mixed with a solution or suspension of an isothiuronium salt in the cold or if desired at a raised temperature, and the precipitated dyestuff isothiuronium salt, which is generally practically insoluble in water, is separated, for example, by filtration. By thoroughly washing it with water, the product can be obtained practically free from inorganic salts.

The products of the present process are new. They are valuable isothiuronium salts which are very sparingly soluble to insoluble in water, and of which the anion is that of an acid chromium monoazo-dyestuff. Especially valuable are those isothiuronium salts of chromiferous monoazo-dyestuffs, of which the isothiuronium cation contains bound to the sulfur atom through an alkylene or alkylidene group an aliphatic or aromatic radical containing at least three carbon atoms and free from groups imparting solubility in water, for example, an S-alkyl- or S-aralkyl-isothiuronium salt of a monoazo-dyestuff chromium complex containing a sulfonic acid group.

These new products are valuable dyestuffs and generally possess a good solubility in various organic solvents such as are customarily used for the production of lacquers and spinning masses, especially acetyl-cellulose spinning masses. They are also suitable as pigments or as transparent dyestuffs for dyeing natural or artificial waxes or resins, for example, polyvinyl chloride, cellulose esters or Celluloid. They are generally distinguished by a good fastness to light and good fastness to migration and sublimation.

The following examples illustrate the invention, the parts and percentages being by weight:

*Example 1*

30 parts of the chromiferous dyestuff from diazotized 1-amino-2-hydroxynaphthalene-4-sulfonic acid and 1-hydroxynaphthalene-8-sulfonic acid, which contains one atom of chromium per molecule of dyestuff, are dissolved in 1000 parts of water. Into the resulting solution there is run slowly at room temperature a solution of 40 parts of S-benzyl-isothiuronium chloride in 200 parts of water. The isothiuronium salt of the dyestuff precipitates completely, and is filtered off and washed with water. The dry dyestuff is a dark blue powder which dissolves easily in alcohol with a blue coloration. A solution of the dyestuff in nitrocellulose lacquer when applied to a suitable substratum yields coatings of good fastness to light.

Similar isothiuronium salts are obtained from the 1:1-chromium complexes of the ortho:ortho'-dihydroxy-monoazo-dyestuffs obtained from the diazo-components and coupling components in columns $a$ and $b$ of the following table by reacting them in a manner analogous to that described above with the isothiuronium compounds given in column $c$. In column $d$ are given the tints of coatings produced with nitrocellulose lacquers containing the dyestuff.

which dissolves easily in alcohol and acetone, and dyes cellulose acetate silk spinning masses black tints.

The chromiferous dyestuff described above can also be reacted in the same manner with S-benzyl-thiuronium acetate (obtained by reacting S-benzyl-thiuronium chloride with sodium acetate). In this manner there is also obtained a product which is easily soluble in alcohol and acetone.

Example 3

40 parts of the chromiferous azo dyestuff from diazotized 4-nitro-2-amino-1-hydroxybenzene-6-sulfonic acid and 1-phenyl-3-methyl-5-pyrazolone, which contains one atom of chromium per molecule of dyestuff, are dissolved in 1500 parts of water, and the solution is mixed at room temperature with a solution of 30 parts of S-lauryl-isothiuronium chloride in 100 parts of water. The precipitated S-lauryl-isothiuronium-dyestuff sulfonate is filtered off and dried. It is a brown powder which

| | Diazo components $a$ | Coupling components $b$ | $c$ | $d$ |
|---|---|---|---|---|
| 1 | 1-amino-2-hydroxy-4-sulfonaphthalene (NH$_2$, OH, SO$_3$H on naphthalene) | 1-hydroxy-naphthalene-sulfonic acid (HO, SO$_3$H) | HBr·H$_2$N—C(=NH)—S—C$_4$H$_9$ | blue. |
| 2 | 1-amino-2-hydroxy-4-sulfonaphthalene | 1-hydroxy-naphthalene-sulfonic acid | HCl·H$_2$N—C(=NH)—S—C$_5$H$_{11}$ | Do. |
| 3 | 1-amino-2-hydroxy-4-sulfonaphthalene | 1-hydroxy-naphthalene-sulfonic acid | HCl·H$_2$N—C(=NH)—S—CH$_2$—CO—O—C$_2$H$_5$ | Do. |
| 4 | 1-amino-2-hydroxy-4-sulfonaphthalene | 1-hydroxy-naphthalene-sulfonic acid | HCl·H$_2$N—C(=NH)—S—CH(CH$_2$CH$_3$)(CH$_2$CH$_3$)—CH$_3$ | Do. |
| 5 | 2-amino-1-hydroxy-5-sulfo-4-chlorobenzene (OH, HO$_3$S, NH$_2$, Cl) | 1-(4-sulfophenyl)-3-methyl-5-hydroxy-pyrazole | HCl·H$_2$N—C(=NH)—S—C$_5$H$_{11}$ | orange. |

Example 2

50 parts of the chromiferous dyestuff from diazotized 6-nitro-1-amino-2-hydroxynaphthalene-4-sulfonic acid and 2-hydroxynaphthalene, which contains about ½ atomic proportion of chromium per molecular proportion of dyestuff, are dissolved at 60° C. in 1000 parts of water. After cooling the solution to 35° C., there is added in the course of one hour a solution of 36 parts of S-amyl-isothiuronium chloride in 100 parts of water. The precipitated dyestuff salt is filtered off, washed free from salts with water and dried. It is a black powder dissolves easily in alcohol and acetone, and dyes cellulose acetate artificial silk spinning masses orange tints.

What is claimed is:

1. An isothiuronium salt of an acid chromiferous monoazo dyestuff which is a complex chromium compound of an ortho:ortho'-dihydroxy-monoazo-dyestuff, containing a sulfonic acid group and one atom of chromium bound in complex union per molecule of a monoazo-dyestuff selected from the group consisting of benzene-azo-pyrazolone dyestuffs and naphthalene-azo-naphthol dyestuffs.

2. An S-alkyl isothiuronium salt of an acid chromiferous monoazo-dyestuff which is a complex chromium compound of an ortho-hydroxy-benzene-monoazo-pyrazolone dyestuff, containing a sulfonic acid group and one atom of chromium bound in complex union per molecule of monoazo-dyestuff, the S-alkyl substituent containing at most 12 carbon atoms.

3. An S-benzyl isothiuronium salt of an acid chromiferous monoazo-dyestuff which is a complex chromium compound of an ortho:ortho'-dihydroxy-monoazo-dyestuff, containing a sulfonic acid group and one atom of chromium bound in complex union per molecule of an ortho:ortho'-dihydroxynaphthalene-azo-naphthalene dyestuff.

4. An S-benzyl isothiuronium salt of a 1:1-complex chromium compound of an ortho:ortho'-dihydroxymonoazo-dyestuff containing a sulfonic acid group.

5. The S-benzyl isothiuronium salt of the complex chromium compound containing one atom of chromium bound in complex union with one molecule of the monoazo-dyestuff which in the free acid state corresponds to the formula

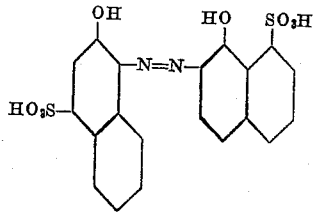

6. The S-amyl isothiuronium salt of the complex chromium compound containing one atom of chromium bound in complex union with one molecule of the monoazo-dyestuff which in the free acid state corresponds to the formula

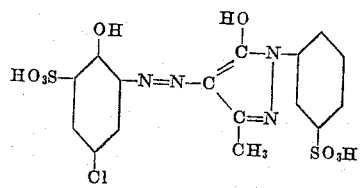

7. The S-benzyl isothiuronium salt of the complex chromium compound containing one atom of chromium bound in complex union with substantially two molecules of the monoazo-dyestuff which in its free acid state corresponds to the formula

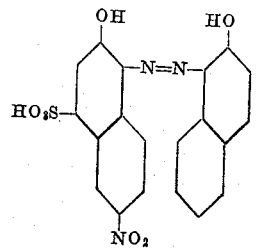

References Cited in the file of this patent
UNITED STATES PATENTS

| | | |
|---|---|---|
| 2,302,762 | Graenacher et al. | Nov. 24, 1954 |
| 2,768,171 | Clarke et al. | Oct. 23, 1956 |